(12) United States Patent
Horesh

(10) Patent No.: US 9,785,234 B2
(45) Date of Patent: Oct. 10, 2017

(54) ANALYSIS OF AMBIENT LIGHT FOR GAZE TRACKING

(71) Applicant: Intel Corporation, Santa Clara, CA (US)

(72) Inventor: Nizan Horesh, Caesarea (IL)

(73) Assignee: Intel Corporation, Santa Clara, CA (US)

( * ) Notice: Subject to any disclaimer, the term of this patent is extended or adjusted under 35 U.S.C. 154(b) by 64 days.

(21) Appl. No.: 14/757,834

(22) Filed: Dec. 26, 2015

(65) Prior Publication Data

US 2017/0185145 A1    Jun. 29, 2017

(51) Int. Cl.
*H04N 9/47* (2006.01)
*G06F 3/01* (2006.01)
(Continued)

(52) U.S. Cl.
CPC ............ *G06F 3/013* (2013.01); *G06F 1/1686* (2013.01); *G06K 9/0061* (2013.01);
(Continued)

(58) Field of Classification Search
CPC ... G06F 3/013; G06F 1/1686; G06K 9/00604; G06K 9/0061; G06T 7/0022;
(Continued)

(56) References Cited

U.S. PATENT DOCUMENTS 7,401,920 B1 *   7/2008   Kranz .................... A61B 3/113
                                                                351/209

2010/0053555 A1 *   3/2010   Enriquez ................ A61B 3/113
                                                                351/210

(Continued)

FOREIGN PATENT DOCUMENTS

EP          1562469 B1     5/2009
KR     1020020073747 A     9/2002
KR     1020120059959 A     6/2012

OTHER PUBLICATIONS

International Search Report and Written Opinion received for PCT Application No. PCT/US2013/059969, mailed Jun. 11, 2014, 10 pages.

(Continued)

*Primary Examiner* — William Tran
(74) *Attorney, Agent, or Firm* — Barnes & Thornburg LLP

(57) ABSTRACT

Technologies for gaze tracking by ambient light include a mobile compute device to capture a first image of a user of the mobile compute device by a first camera and a second image of a real-world environment of the mobile compute device by a second camera. The mobile compute device determines a physical location of a light source relative to the mobile compute device based on the second image and identifies a first and second corneal reflection in an eye of the user captured in the first image. The mobile compute device determines, based on the physical location, a first correspondence between the first corneal reflection and the light source and a second correspondence between the second corneal reflection and an image displayed on a display of the mobile compute device. Further, the mobile compute device performs gaze tracking based on the first correspondence and the second correspondence.

25 Claims, 7 Drawing Sheets

(51) Int. Cl.
*G06F 1/16* (2006.01)
*H04N 5/247* (2006.01)
*H04N 5/225* (2006.01)
*G06T 7/00* (2017.01)
*G06K 9/00* (2006.01)

(52) U.S. Cl.
CPC ........ G06K 9/00604 (2013.01); G06T 7/0022 (2013.01); G06T 7/0042 (2013.01); G06T 7/0048 (2013.01); H04N 5/2256 (2013.01); H04N 5/247 (2013.01); *G06T 2207/10016* (2013.01); *G06T 2207/30201* (2013.01)

(58) Field of Classification Search
CPC ................ G06T 7/0042; G06T 7/0048; G06T 2207/10016; G06T 2207/30201; H04N 5/2256; H04N 5/247
USPC .......................................................... 348/78
See application file for complete search history.

(56) References Cited

U.S. PATENT DOCUMENTS

| | | | |
|---|---|---|---|
| 2012/0120241 A1 | 5/2012 | Lewis et al. | |
| 2012/0262599 A1 | 10/2012 | Brunner | |
| 2012/0270571 A1 | 10/2012 | Biller et al. | |
| 2013/0295994 A1* | 11/2013 | Guitteaud | F16M 13/00 455/556.1 |
| 2015/0199006 A1* | 7/2015 | He | A61B 3/113 345/158 |
| 2016/0103484 A1* | 4/2016 | Guo | G06F 3/005 345/156 |

OTHER PUBLICATIONS

"Rolling shutter", downloaded from http://en.wikipedia.org/w/index.php?tilte=Rolling_shutter&oldid=548756922, edited Apr. 5, 2013.

"Rolling vs Global Shutter", downloaded from http://www.motionvideoproducts.com/MVP%20papers/Rolling%20vs%20Global%20Shutter.pdf, Mar. 3, 2009.

* cited by examiner

ANALYSIS OF AMBIENT LIGHT FOR GAZE TRACKING

BACKGROUND

Eye tracking and gaze tracking techniques are used to determine the direction of a person's gaze (i.e., the direction the person is looking) based on captured images. In doing so, a wide array of image analysis techniques may be employed. For example, in some embodiments, video images may be analyzed to determine the orientation of a person's head and/or the relative position of the person's pupil. Other common gaze tracking methods rely on the measurement of reflections of a known infrared (IR) light source on the cornea of the person being tracked. Such techniques generally include a dedicated IR camera (e.g., IR projector and sensor), which may require a significant cost and/or footprint on a mobile computing device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
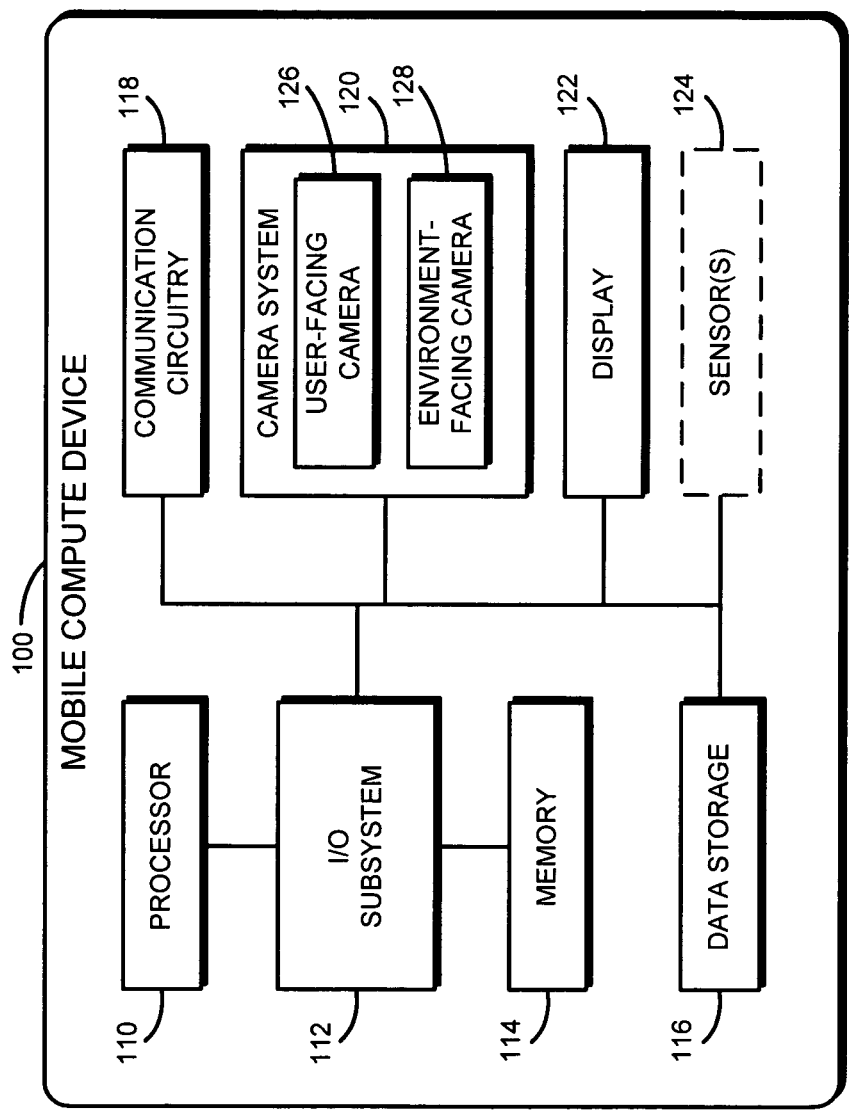
FIG. 1 is a simplified block diagram of at least one embodiment of a mobile compute device for gaze tracking by ambient light.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a mobile compute device 100 for gaze tracking by ambient light is shown. In use, as described in more detail below, the mobile compute device 100 is configured to capture an image of a user of the mobile compute device 100 and an image of a real-world environment of the mobile compute device 100. The mobile compute device 100 further analyzes the captured image of the real-world environment to determine the physical location of a light source outputting ambient light visible to the mobile compute device 100 (e.g., not occluded and powerful enough). Further, in the illustrative embodiment, the mobile compute device 100 analyzes the captured image of the user to identify corneal reflections (i.e., glints) in an eye of the user and determine which light source each corneal reflection corresponds with (e.g., a reflection of a light source captured in the real-world image, a reflection of an image displayed on a display of the mobile compute device 100, etc.) and performs gaze tracking based on those determinations.

The mobile compute device 100 may be embodied as any type of computing device capable of performing the functions described herein. For example, the mobile compute device 100 may be embodied as a smartphone, cellular phone, wearable computing device, personal digital assistant, mobile Internet device, tablet computer, netbook, notebook, Ultrabook™, laptop computer, and/or any other mobile computing/communication device. Although the mobile compute device 100 is described herein as being mobile in the illustrative embodiment, it should be appreciated that the mobile compute device 100 may be embodied as a stationary computing device in other embodiments (e.g., a desktop computer). As shown in FIG. 1, the illustrative mobile compute device 100 includes a processor 110, an input/output ("I/O") subsystem 112, a memory 114, a data storage 116, a communication circuitry 118, a camera system 120, and a display 122. Further, in some embodiments, the mobile compute device 100 may include one or more sensors 124. Of course, the mobile compute device 100 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the mobile compute device 100 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the mobile compute device 100. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the mobile compute device 100, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the mobile compute device 100 as described herein.

The communication circuitry 118 may be embodied as any communication circuit, device, or collection thereof, capable of enabling communications between the mobile compute device 100 and other remote devices over a network (not shown). For example, in some embodiments, the mobile compute device 100 may offload one or more of the functions described herein to a remote computing device. The communication circuitry 118 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The camera system 120 includes a plurality of cameras configured to capture images or video (i.e., collections of images or frames) and capable of performing the functions described herein. It should be appreciated that each of the cameras of the camera system 120 may be embodied as any peripheral or integrated device suitable for capturing images, such as a still camera, a video camera, or other device capable of capturing video and/or images. In the illustrative embodiment, the camera system 120 includes a user-facing camera 126 and an environment-facing camera 128. Depending on the particular embodiment, each of the user-facing camera 126, the environment-facing camera 128, and/or other cameras of the camera system 120 may be embodied as a two-dimensional (2D) camera (e.g., an RGB camera) or a three-dimensional (3D) camera. Such 3D cameras include, for example, depth cameras, bifocal cameras, and/or cameras otherwise capable of generating a depth image, channel, or stream. In another embodiment, one or more of the cameras of the camera system 120 include at least two lenses and corresponding sensors configured to capture images from at least two different viewpoints of a scene (e.g., a stereo camera).

As described in greater detail below, the user-facing camera 126 is configured to capture images of the user of the mobile compute device 100. In particular, the user-facing camera 126 captures images of the user's face, which may be analyzed to determine the location of the user's eye(s) relative to the mobile compute device 100 (e.g., relative to the user-facing camera 126, relative to the display 122, and/or another reference point of the mobile compute device 100). The environment-facing camera 128 captures images of the real-world environment of the mobile compute device 100. In the illustrative embodiment, the user-facing camera 126 and the environment-facing camera 128 are positioned on opposite sides of the mobile compute device 100 and therefore have fields of view in opposite directions. In particular, in the illustrative embodiment, the user-facing camera 126 is on the same side of the mobile compute device 100 as the display 122 such that the user-facing camera 126 may capture images of the user as she views the display 122 and a displayed image may be reflected in the user's eye.

The display 122 of the mobile compute device 100 may be embodied as any type of display on which information may be displayed to a user of the mobile compute device 100. Further, the display 122 may be embodied as, or otherwise use any suitable display technology including, for example, a liquid crystal display (LCD), a light emitting diode (LED) display, a cathode ray tube (CRT) display, a plasma display, a touchscreen display, and/or other display technology. Although only one display 122 is shown in the illustrative embodiment of FIG. 1, in other embodiments, the mobile compute device 100 may include multiple displays 122.

As shown in FIG. 1, the mobile compute device 100 may include one or more sensors 124 configured to generate data/signals indicative of an environment or context of the mobile compute device 100 and/or user of the mobile compute device 100. In various embodiments, the sensors 124 may be embodied as, or otherwise include, for example, inertial sensors, position sensors, location sensors, proximity sensors, optical sensors, light sensors, audio sensors, temperature sensors, motion sensors, piezoelectric sensors, and/or other types of sensors. Of course, the mobile compute device 100 may also include components and/or devices configured to facilitate the use of the sensor(s) 124.

Figure 2:
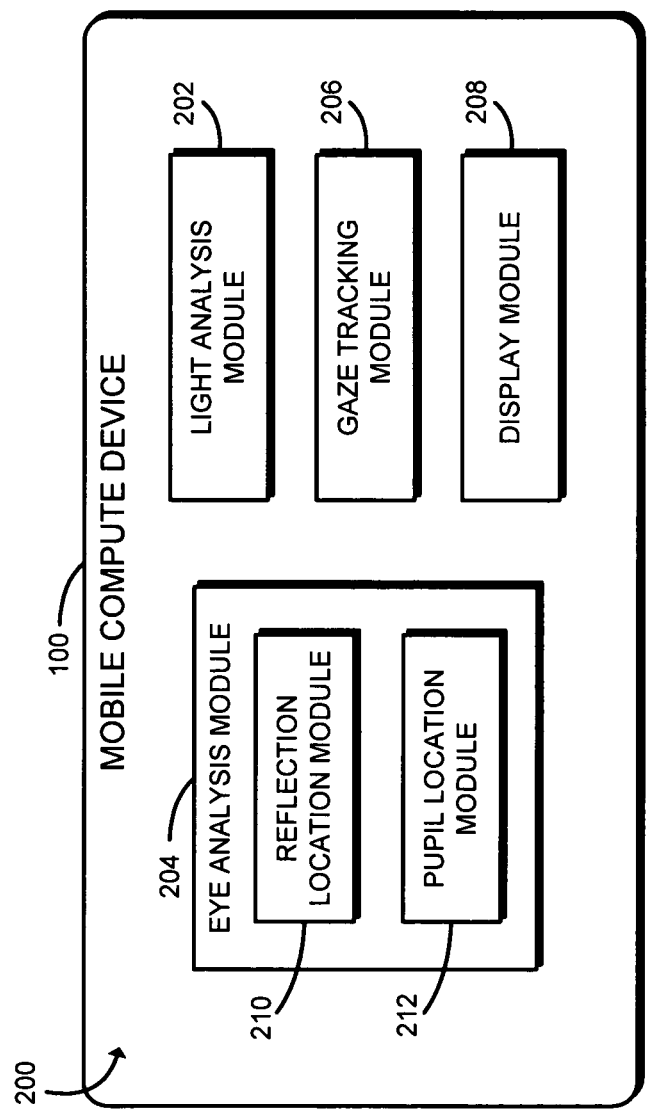
FIG. 2 is a simplified block diagram of at least one embodiment of an environment of the mobile compute device of FIG. 1.

Referring now to FIG. 2, in use, the mobile compute device 100 establishes an environment 200 for gaze tracking by ambient light. The illustrative environment 200 includes a light analysis module 202, an eye analysis module 204, a gaze tracking module 206, and a display module 208. Additionally, in the illustrative embodiment, the eye analysis module 204 includes a reflection location module 210 and a pupil location module 212. The various modules of the environment 200 may be embodied as hardware, software, firmware, or a combination thereof. For example, the various modules, logic, and other components of the environment 200 may form a portion of, or otherwise be established by, the processor 110 or other hardware components of the mobile compute device 100. As such, in some embodiments, one or more of the modules of the environment 200 may be embodied as circuitry or collection of electrical devices (e.g., a light analysis circuitry, an eye analysis circuitry, a gaze tracking circuitry, a display circuitry, a reflection location circuitry, and/or a pupil location circuitry). Additionally, in some embodiments, one or more of the illustrative modules may form a portion of another module and/or one or more of the illustrative modules may be independent of one another.

The light analysis module 202 is configured to analyze one or more images of the real-world environment captured by the environment-facing camera 128 to determine the physical location of one or more light sources outputting ambient light (e.g., a lamp, ceiling light, television, display, etc.) relative to the mobile compute device 100. As described below, in doing so, the light analysis module 202 may determine the image location (e.g., pixels/region in a captured image) of the one or more light sources in the captured image and determine the direction of the light source(s) relative to the mobile compute device 100 based on the image location. For example, in some embodiments, the light analysis module 202 may identify region(s) of the captured image having high intensity and/or high contrast pixel values relative to surrounding image regions. As described in greater detail below, the light analysis module 202 may analyze multiple images of the same light source (e.g., from different perspectives) and/or utilize triangulation techniques to determine the physical location of that light source relative to the mobile compute device 100.

The eye analysis module 204 is configured to analyze one or more images of the user captured by the user-facing camera 126. As indicated above, in the illustrative embodiment, the eye analysis module 204 includes the reflection location module 210 and the pupil location module 212. The reflection location module 210 is configured to analyze a captured image of the user to identify the user's eye in the captured image and, more specifically, to identify the corneal reflections in the user's eye. For example, the reflection location module 210 may determine the image location in the captured image in which reflections of the ambient light from the light source(s) and/or displayed images on the display 122 are visible on the user's cornea. As described herein, in some embodiments, the corneal reflections may be identified as regions of the captured image having high intensity and/or high contrast pixel values relative to surrounding image regions. Further, in the illustrative embodiment, the reflection location module 210 is configured to determine which light source each corneal reflection corresponds with (e.g., a reflection of a light source captured in the real-world image, a reflection of an image displayed on the display 122, etc.). In some embodiments, to do so, the reflection location module 210 may match one or more of the corneal reflections to the light source or displayed image based on known characteristics of the light source or displayed image (e.g., size, color, shape, etc.). The pupil location module 212 is configured to analyze the image of the user's eye to determine the image location of the user's pupil or, more specifically, the edge of the user's pupil.

The gaze tracking module 206 is configured to perform gaze tracking (i.e., monitor the direction of the user's gaze) based on the determined correspondences. In some embodiments, the gaze tracking is further based on the edge of the user's pupil. It should be appreciated that the gaze tracking module 206 may utilize any suitable techniques, algorithms, and/or mechanisms for performing gaze tracking consistent with the techniques described herein.

The display module 208 renders images on the display 122 for the user of the mobile compute device 100 to view. In some embodiments, the display 122 may be used as an additional source of light for performing the analyses described herein. Further, in some embodiments, the relative intensity of the displayed image(s) may be pre-calculated or determined, for example, in order to distinguish the corneal reflections on the user's eye and determine the proper correspondences between the reflections and the light sources. For example, a high intensity blue light displayed on the display 122 would be similarly reflected in the user's cornea (i.e., as a high intensity blue light).

Figure 3:
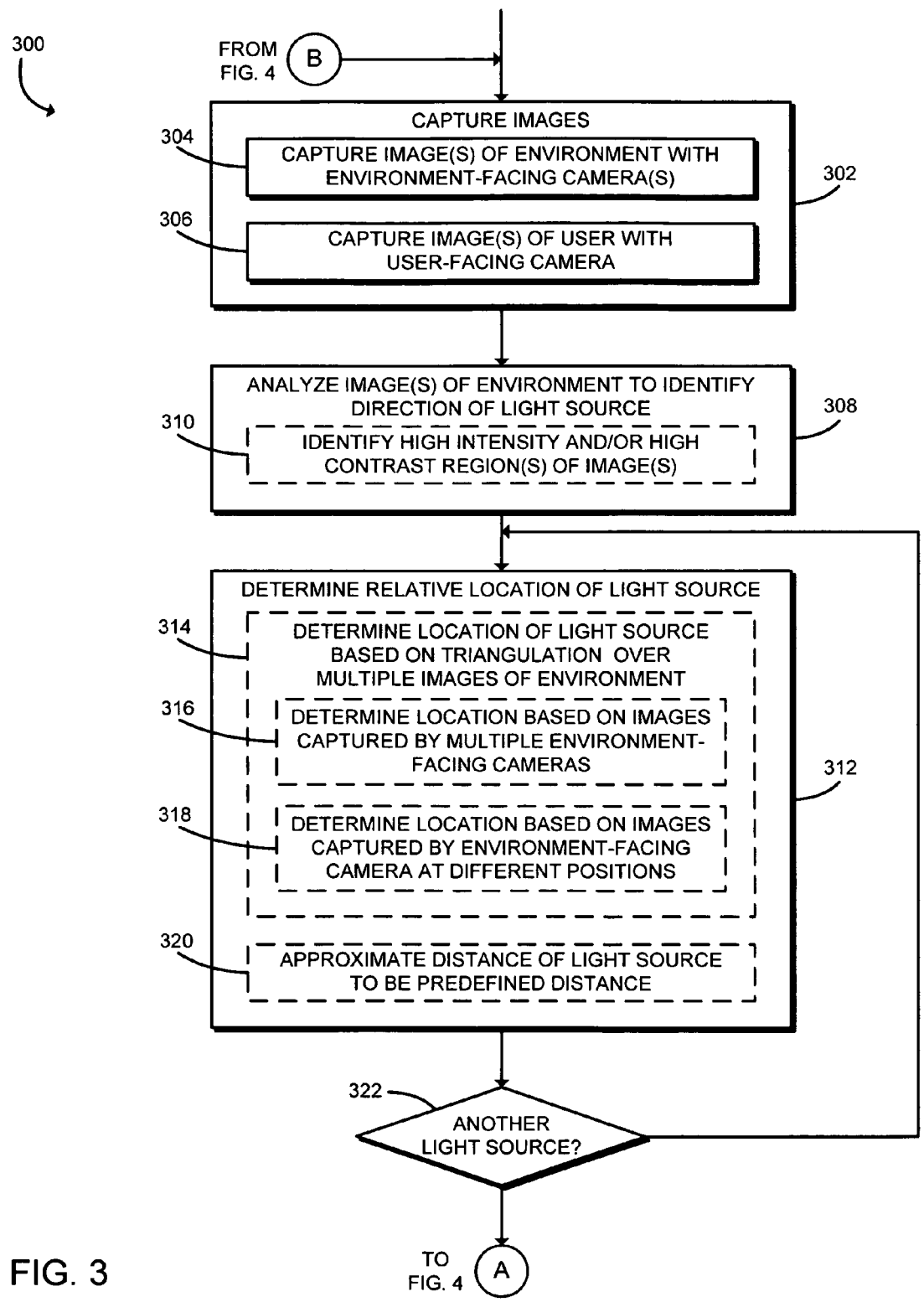
FIGS. 3-4 is a simplified flow diagram of at least one embodiment of a method for gaze tracking by ambient light that may be executed by the mobile compute device of FIG. 1.
Figure 5:
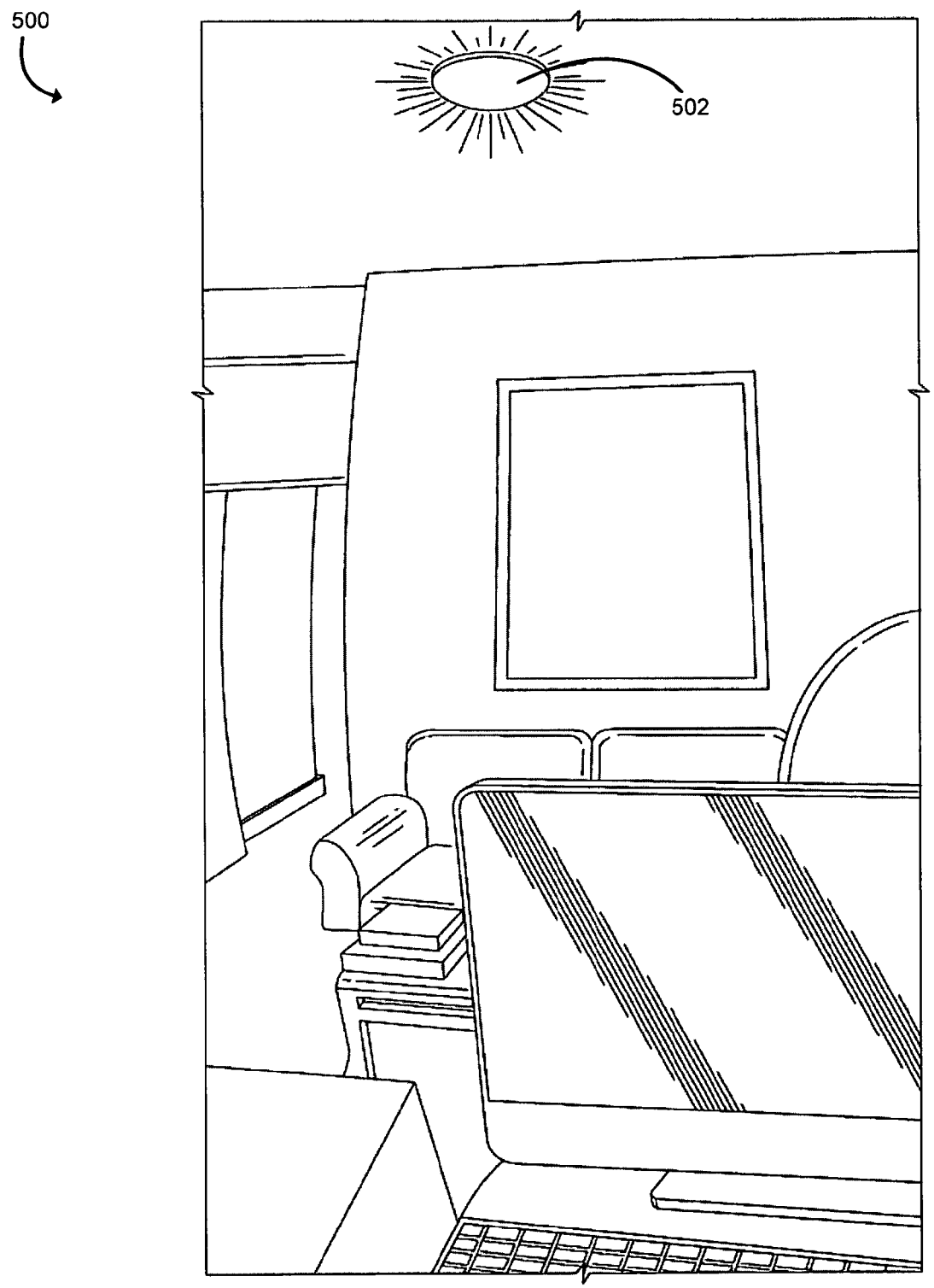
FIG. 5 is an illustrative image of a real-world environment captured by an environment-facing camera of the mobile compute device of FIG. 1.
Figure 6:
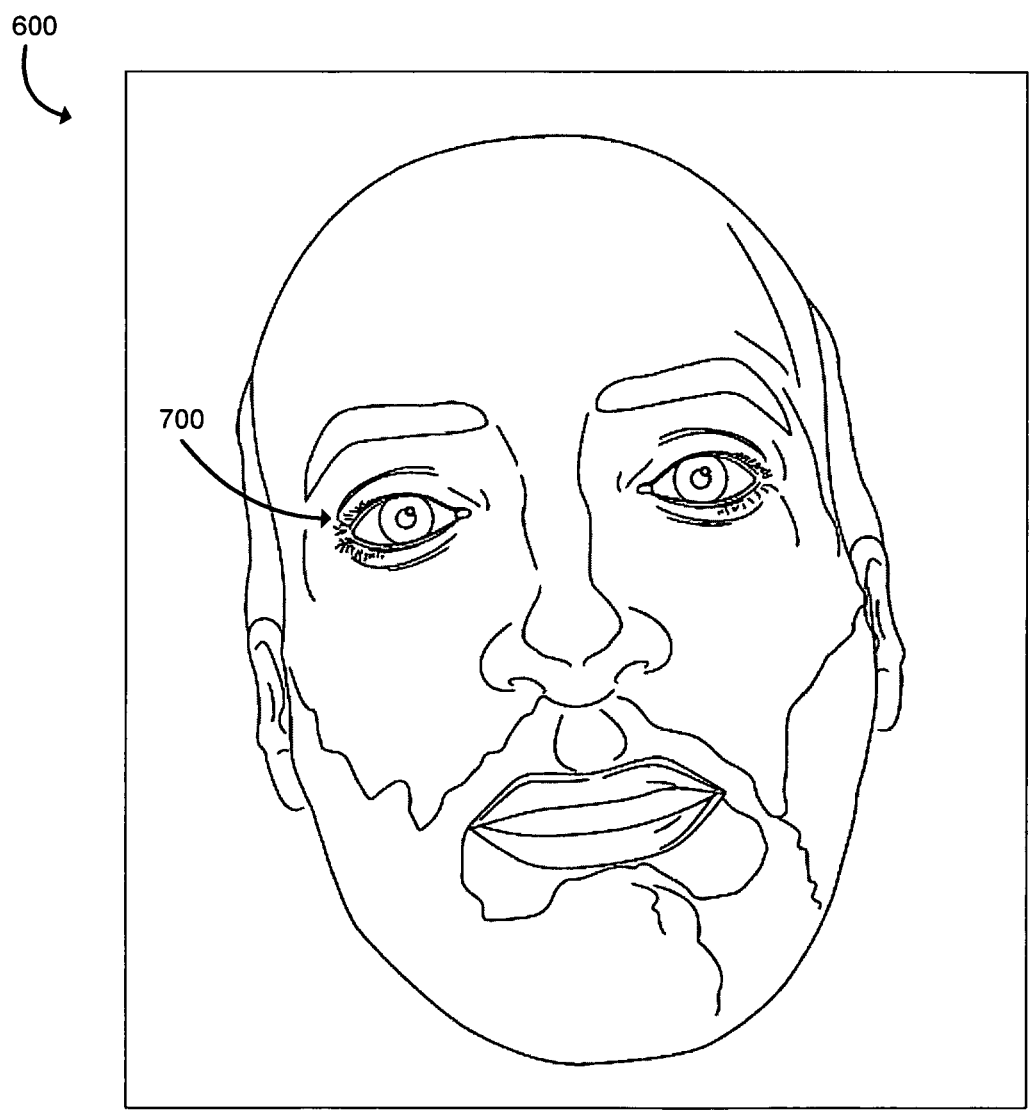
FIG. 6 is an illustrative image of a user captured by a user-facing camera of the mobile compute device of FIG. 1.

Referring now to FIG. 3, in use, the mobile compute device 100 may execute a method 300 for gaze tracking by ambient light. The illustrative method 300 begins with block 302 in which the mobile compute device 100 captures a plurality of images with the camera system 120. In doing so, in block 304, the mobile compute device 100 captures one or more images of the real-world environment with the environment-facing camera 128. As described herein, the real-world environment may include one or more ambient light sources visible to the mobile compute device 100 that may be used for gaze tracking. For example, as shown in FIG. 5, an illustrative captured image 500 of the real-world environment depicts a light source 502. As described below, in some embodiments, the mobile compute device 100 may capture multiple images of the real-world environment (e.g., with the same camera 128 or multiple cameras 128) for analysis in determining the physical location of the light source (e.g., the light source 502) relative to the mobile compute device 100. In block 306, the mobile compute device 100 captures one or more images of the user's face with the user-facing camera 126 (see, for example, an illustrative captured image 600 as shown in FIG. 6).

In block 308, the mobile compute device 100 analyzes the image of the real-world environment to identify a light source in the captured image and the direction of the light source relative to the mobile compute device 100 (e.g., relative to a particular reference point of the mobile compute device 100). In doing so, in block 310, the mobile compute device 100 may identify the light source as a region of the captured image having high intensity and/or high contrast pixel values relative to surrounding image regions. For example, a light source that emits white ambient light may appear as a bright white region in the captured image. In some embodiments, the mobile compute device 100 may utilize one or more edge detection and/or image segmentation techniques to identify the light source (e.g., Sobel filters, Canny edge detection, pyramid segmentation, etc.). It should be appreciated that the mobile compute device 100 may utilize any suitable techniques, algorithms, and/or mechanisms for determining the direction of the light source relative to the mobile compute device 100 based on the identified image location of the light source in the captured image. For example, in some embodiments, the mobile compute device 100 may leverage stored coordinate information, angular information, and/or other relevant information regarding the camera system 120 of the mobile compute device 100.

In block 312, the mobile compute device 100 determines the physical location of the light source relative to the mobile compute device 100 (or other reference point). It should be appreciated that the mobile compute device 100 may utilize any suitable techniques for doing so. For example, in block 314, the mobile compute device 100 may determine the location of the light source based on triangulation over multiple images of the real-world environment that include that particular light source. In particular, in block 316, the mobile compute device 100 may determine the physical location based on images of the light source captured by multiple environment-facing cameras 128 or based on images of the light source captured by multiple lenses of the same environment-facing camera 128 (e.g., a 3D or stereo camera). In block 318, the mobile compute device 100 may determine the physical location based on multiple images of the light sources captured by the same environment-facing camera 128 (or multiple environment-facing cameras 128) at different positions relative to the light source (e.g., captured at different points in time). For example, in some embodiments, the environment-facing camera 128 may be embodied as a video camera, and motion of the camera 128 may be estimated (e.g., from the video stream or inertial sensors) in order to perform triangulation over frames captured at different times and locations of the mobile compute device 100. In other words, the mobile compute device 100 may determine the physical location of the light source based on the direction of the light source relative to two different reference points of the mobile compute device 100 (e.g., via triangulation). In other embodiments, in block 320, the mobile compute device 100 may approximate the distance of the light source from the mobile compute device 100 to be a predefined distance (e.g., infinity, an arbitrarily large distance, etc.). It should be appreciated that, in some embodiments, distances exceeding a threshold distance (e.g., two meters) may be estimated to be the predefined distance without suffering significant accuracy loss of gaze estimation.

Figure 4:
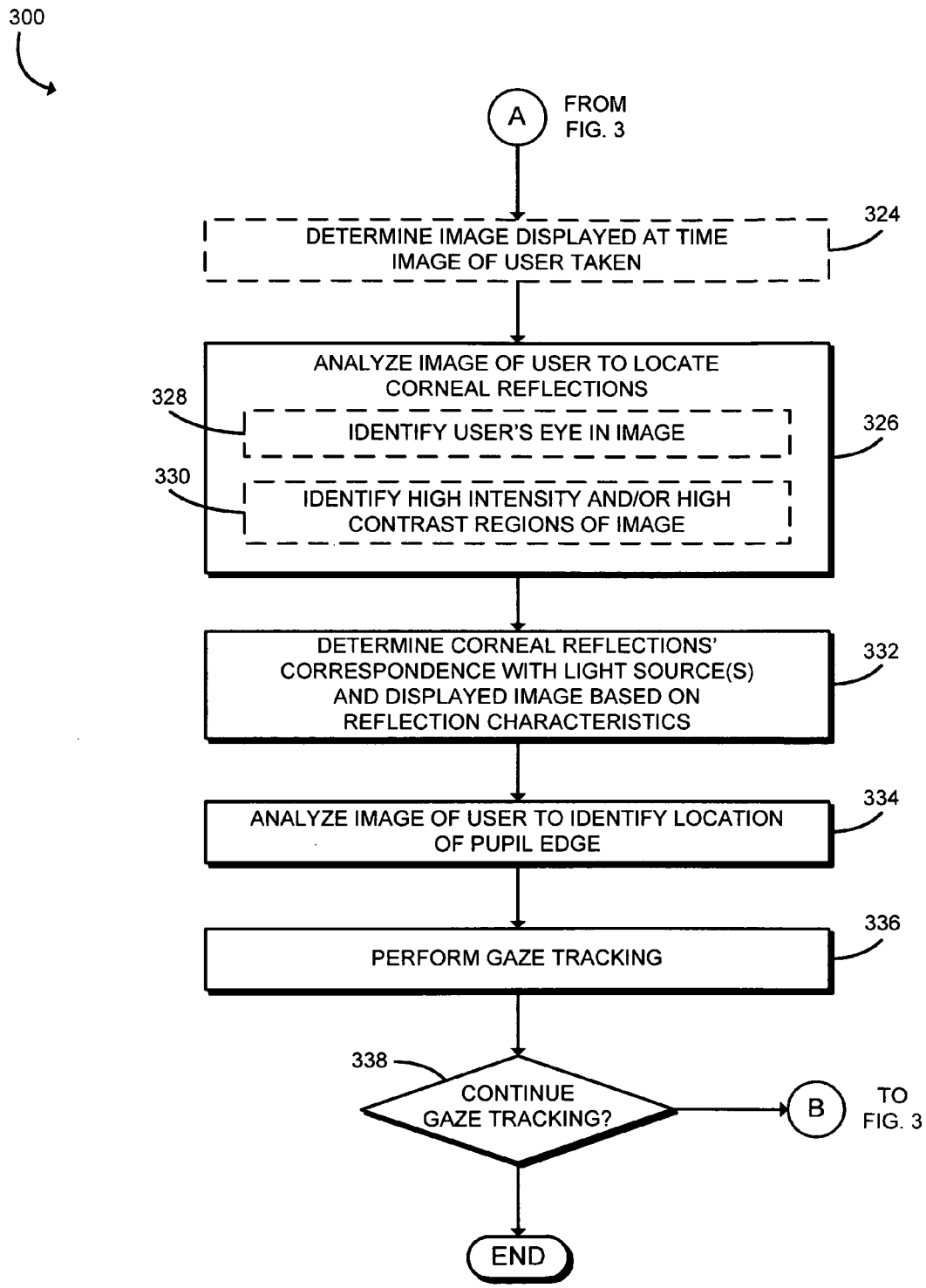

In some embodiments, the mobile compute device 100 may utilize multiple ambient light sources to perform gaze tracking. In such embodiments, in block 322, the mobile compute device 100 may determine whether to identify another light source in the captured image(s) of the real-world environment. If so, the method 300 returns to block 308 to analyze the image(s). Otherwise, the method 300 advances to block 324 of FIG. 4 in which the mobile compute device 100 may determine an image displayed on the display 122 at the time the image of the user was taken. For example, in some embodiments, the display 122 may include a display controller that tracks various characteristics of displayed images and/or the displayed images themselves, which may be used for various analyses as described herein (e.g., matching corneal reflections to the corresponding light source).

In block 326, the mobile compute device 100 analyzes the captured image of the user (e.g., the image 600 of FIG. 6) to locate the corneal reflections in the user's eye (e.g., the reflections of the light source(s) and/or the images shown on the display 122 from the user's eyes). It should be appreciated that the mobile compute device 100 may utilize any suitable image analysis techniques, algorithms, filters, and/or mechanisms to locate the corneal reflections, match the corneal reflections with the light sources, and/or perform other analyses described herein. In block 328, the mobile compute device 100 may identify the user's eye in the captured image, for example, to reduce the region of the image required to be analyzed for glint analysis and gaze tracking. Although the techniques are described herein in reference to the analysis of a single eye of the user, it should be appreciated that both of the user's eyes may be analyzed in some embodiments. In some embodiments, in block 330, the mobile compute device 100 may identify the corneal reflections on the user's eye as regions of the captured image having high intensity and/or high contrast pixel values relative to surrounding image regions.

Figure 7:
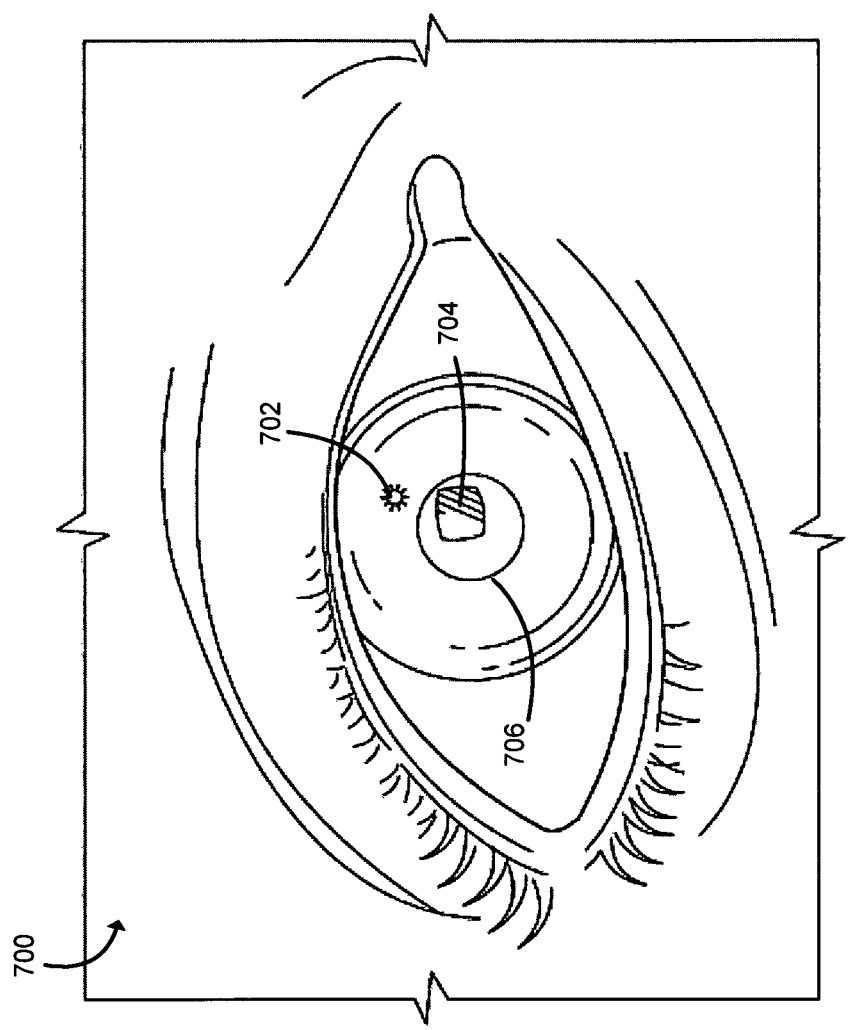
FIG. 7 is a close-up view of the user's eye captured in the illustrative image of FIG. 6.

In block 332, the mobile compute device 100 may determine which light source each identified corneal reflection on the user's eye corresponds with (e.g., a reflection of a light source captured in the real-world image, a reflection of an image displayed on the display 122, etc.) based on the reflection characteristics. In some embodiments, the mobile compute device 100 may match each corneal reflection with the source of the reflection based on the location, size, color, shape, and/or other characteristics of the reflection. For example, as shown in FIG. 7, the user's eye 700 captured in the illustrative image 600 (see FIG. 6) of the user shows two corneal reflections: a corneal reflection 702 of the light source 502 in the real-world environment of the mobile compute device 100 (see FIG. 5) and a corneal reflection 704 of the display 122 of the mobile compute device 100. It should be appreciated that the mobile compute device 100 may utilize any suitable characteristics of the corneal reflections and/or other known information to distinguish the corneal reflections from one another and determine the light source with which they correspond. For example, in many embodiments, the reflection from the display 122 is likely to appear on or near the user's pupil due to being held directly in front of the user, whereas other ambient light sources are likely to appear in the periphery of the user's eye, for example, because they would otherwise be occluded by the mobile compute device 100. Further, as indicated above, a corneal reflection of the image shown on the display 122 will have similar characteristics as the displayed image itself (e.g., a similar shape and color).

In block 334, the mobile compute device 100 analyzes the captured image of the user's eye to determine the image location of the user's pupil or, more specifically, the edge of the user's pupil (e.g., the edge 706 as shown in FIG. 7). The mobile compute device 100 may employ any suitable image analysis techniques for doing so. Further, it should be appreciated that the identification of the user's pupil may independent of the glint analysis techniques described herein and, therefore, may occur contemporaneously with, prior to, or subsequent to such techniques. In block 336, the mobile compute device 100 performs gaze tracking (i.e., monitors the direction of the user's gaze) based on the determined correspondences between light sources and corneal reflections and the identified edge of the user's pupil. It should be appreciated that the gaze tracking may be based on any suitable techniques, algorithms, and/or mechanisms consistent with the techniques described herein.

In block 338, the mobile compute device 100 determines whether to continue gaze tracking. If so, the method 300 returns to block 302 of FIG. 3 in which the mobile compute device 100 captures another set of images with the camera system 120. In other words, in performing gaze tracking, the mobile compute device 100 may repeatedly identify the location of the light sources relative to the mobile compute device 100 (e.g., if the mobile compute device 100 and/or the light sources are moving) and the corneal reflections that correspond with those light sources.

EXAMPLES

Illustrative examples of the technologies disclosed herein are provided below. An embodiment of the technologies may include any one or more, and any combination of, the examples described below.

Example 1 includes a mobile compute device for gaze tracking by ambient light, the mobile compute device comprising a display; a camera system comprising a first camera and a second camera, the camera system to capture (i) a first image of a user of the mobile compute device with the first camera and (ii) a second image of a real-world environment of the mobile compute device with the second camera; a light analysis module to determine a physical location of a light source relative to the mobile compute device based on the second image; an eye analysis module to (i) identify a first corneal reflection and a second corneal reflection in an eye of the user and (ii) determine, based on the physical location, a first correspondence between the first corneal reflection and the light source and a second correspondence between the second corneal reflection and an image displayed on the display; a gaze tracking module to perform gaze tracking based on the first correspondence and the second correspondence.

Example 2 includes the subject matter of Example 1, and wherein the light analysis module is to (i) analyze the second image to determine an image location of the light source captured in the second image and (ii) determine a direction of the light source relative to the mobile compute device based on the image location; and wherein to determine the physical location of the light source comprises to determine the physical location based on the determined direction.

Example 3 includes the subject matter of any of Examples 1 and 2, and wherein to analyze the second image comprises to identify a region of the second image having at least one of high intensity or high contrast relative to surrounding regions of the second image.

Example 4 includes the subject matter of any of Examples 1-3, and wherein to determine the physical location comprises to determine the physical location of the light source based on the second image and a third image of the real-world environment that includes the light source.

Example 5 includes the subject matter of any of Examples 1-4, and wherein determining the physical location comprises determining a distance of the light source from the mobile compute device by performing triangulation based on the second image and the third image.

Example 6 includes the subject matter of any of Examples 1-5, and wherein to determine the physical location comprises to approximate a distance of the light source from the mobile compute device to a predefined distance.

Example 7 includes the subject matter of any of Examples 1-6, and wherein to identify the first corneal reflection and the second corneal reflection comprises to analyze the first image to identify the user's eye.

Example 8 includes the subject matter of any of Examples 1-7, and wherein to identify the first corneal reflection and the second corneal reflection comprises to identify a first region and a second region of the first image having at least one of high intensity or high contrast relative to surrounding regions of the first image.

Example 9 includes the subject matter of any of Examples 1-8, and wherein to determine the first correspondence and the second correspondence comprises to determine the first correspondence and the second correspondence based on known characteristics of at least one of the light source or the image displayed on the display.

Example 10 includes the subject matter of any of Examples 1-9, and further including a display module to determine the image displayed, at a point in time at which the first image is captured, on the display of the mobile compute device; wherein to determine the second correspondence comprises to determine the second correspondence based on at least one characteristic of the image displayed.

Example 11 includes the subject matter of any of Examples 1-10, and wherein to determine the second correspondence comprises to determine the second correspondence based on at least one of a size or color of the image displayed.

Example 12 includes the subject matter of any of Examples 1-11, and wherein the eye analysis module is to analyze the first image to identify an edge of a pupil of the user; and wherein to perform the gaze tracking comprises to perform the gaze tracking based further on the edge of the pupil of the user.

Example 13 includes the subject matter of any of Examples 1-12, and wherein the first camera has a field of view in a direction opposite a field of view of the second camera about the display.

Example 14 includes a method for gaze tracking by ambient light, the method comprising capturing, by a first camera of a mobile compute device, a first image of a user of the mobile compute device; capturing, by a second camera of the mobile compute device different from the first camera, a second image of a real-world environment of the mobile compute device; determining, by the mobile compute device, a physical location of a light source relative to the mobile compute device based on the second image; identifying, by the mobile compute device, a first corneal reflection and a second corneal reflection in an eye of the user captured in the first image; determining, by the mobile compute device and based on the physical location, a first correspondence between the first corneal reflection and the light source and a second correspondence between the second corneal reflection and an image displayed on a display of the mobile compute device; and performing, by the mobile compute device, gaze tracking based on the first correspondence and the second correspondence.

Example 15 includes the subject matter of Example 14, and further including analyzing, by the mobile compute device, the second image to determine an image location of the light source captured in the second image; and determining, by the mobile compute device, a direction of the light source relative to the mobile compute device based on the image location; wherein determining the physical location of the light source comprises determining the physical location based on the determined direction.

Example 16 includes the subject matter of any of Examples 14 and 15, and wherein analyzing the second image comprises identifying a region of the second image having at least one of high intensity or high contrast relative to surrounding regions of the second image.

Example 17 includes the subject matter of any of Examples 14-16, and wherein determining the physical location comprises determining the physical location of the light source based on the second image and a third image of the real-world environment that includes the light source.

Example 18 includes the subject matter of any of Examples 14-17, and wherein determining the physical location comprises determining a distance of the light source from the mobile compute device by performing triangulation based on the second image and the third image.

Example 19 includes the subject matter of any of Examples 14-18, and wherein determining the physical location comprises approximating a distance of the light source from the mobile compute device to a predefined distance.

Example 20 includes the subject matter of any of Examples 14-19, and wherein identifying the first corneal reflection and the second corneal reflection comprises analyzing the first image to identify the user's eye.

Example 21 includes the subject matter of any of Examples 14-20, and wherein identifying the first corneal reflection and the second corneal reflection comprises identifying a first region and a second region of the first image having at least one of high intensity or high contrast relative to surrounding regions of the first image.

Example 22 includes the subject matter of any of Examples 14-21, and wherein determining the first correspondence and the second correspondence comprises determining the first correspondence and the second correspondence based on known characteristics of at least one of the light source or the image displayed on the display.

Example 23 includes the subject matter of any of Examples 14-22, and further including determining the image displayed, at a point in time at which the first image is captured, on the display of the mobile compute device; wherein determining the second correspondence comprises determining the second correspondence based on at least one characteristic of the image displayed.

Example 24 includes the subject matter of any of Examples 14-23, and wherein determining the second correspondence comprises determining the second correspondence based on at least one of a size or color of the image displayed.

Example 25 includes the subject matter of any of Examples 14-24, and further including analyzing, by the mobile compute device, the first image to identify an edge of a pupil of the user; wherein performing the gaze tracking comprises performing the gaze tracking based further on the edge of the pupil of the user.

Example 26 includes the subject matter of any of Examples 14-25, and wherein the first camera has a field of view in a direction opposite a field of view of the second camera about the display.

Example 27 includes a compute device comprising a processor; and a memory having stored therein a plurality of instructions that when executed by the processor cause the compute device to perform the method of any of Examples 14-26.

Example 28 includes one or more machine-readable storage media comprising a plurality of instructions stored thereon that in response to being executed result in a compute device performing the method of any of Examples 14-26.

Example 29 includes a compute device comprising means for performing the method of any of Examples 14-26.

Example 30 includes a mobile compute device for gaze tracking by ambient light, the mobile compute device comprising means for capturing, by a first camera of the mobile compute device, a first image of a user of the mobile compute device; means for capturing, by a second camera of the mobile compute device different from the first camera, a second image of a real-world environment of the mobile compute device; means for determining a physical location of a light source relative to the mobile compute device based on the second image; means for identifying a first corneal reflection and a second corneal reflection in an eye of the user captured in the first image; means for determining, based on the physical location, a first correspondence between the first corneal reflection and the light source and a second correspondence between the second corneal reflection and an image displayed on a display of the mobile compute device; and means for performing gaze tracking based on the first correspondence and the second correspondence.

Example 31 includes the subject matter of Example 30, and further including means for analyzing the second image to determine an image location of the light source captured in the second image; and means for determining a direction of the light source relative to the mobile compute device based on the image location; wherein the means for determining the physical location of the light source comprises means for determining the physical location based on the determined direction.

Example 32 includes the subject matter of any of Examples 30 and 31, and wherein the means for analyzing the second image comprises means for identifying a region of the second image having at least one of high intensity or high contrast relative to surrounding regions of the second image.

Example 33 includes the subject matter of any of Examples 30-32, and wherein the means for determining the physical location comprises means for determining the physical location of the light source based on the second image and a third image of the real-world environment that includes the light source.

Example 34 includes the subject matter of any of Examples 30-33, and wherein the means for determining the physical location comprises means for determining a distance of the light source from the mobile compute device by performing triangulation based on the second image and the third image.

Example 35 includes the subject matter of any of Examples 30-34, and wherein the means for determining the physical location comprises means for approximating a distance of the light source from the mobile compute device to a predefined distance.

Example 36 includes the subject matter of any of Examples 30-35, and wherein the means for identifying the first corneal reflection and the second corneal reflection comprises means for analyzing the first image to identify the user's eye.

Example 37 includes the subject matter of any of Examples 30-36, and wherein the means for identifying the first corneal reflection and the second corneal reflection comprises means for identifying a first region and a second region of the first image having at least one of high intensity or high contrast relative to surrounding regions of the first image.

Example 38 includes the subject matter of any of Examples 30-37, and wherein the means for determining the first correspondence and the second correspondence comprises means for determining the first correspondence and the second correspondence based on known characteristics of at least one of the light source or the image displayed on the display.

Example 39 includes the subject matter of any of Examples 30-38, and, further including means for determining the image displayed, at a point in time at which the first image is captured, on the display of the mobile compute device; wherein the means for determining the second correspondence comprises means for determining the second correspondence based on at least one characteristic of the image displayed.

Example 40 includes the subject matter of any of Examples 30-39, and wherein the means for determining the second correspondence comprises means for determining the second correspondence based on at least one of a size or color of the image displayed.

Example 41 includes the subject matter of any of Examples 30-40, and further including means for analyzing the first image to identify an edge of a pupil of the user; wherein the means for performing the gaze tracking comprises means for performing the gaze tracking based further on the edge of the pupil of the user.

Example 42 includes the subject matter of any of Examples 30-41, and wherein the first camera has a field of view in a direction opposite a field of view of the second camera about the display.

The invention claimed is:

1. A mobile compute device for gaze tracking by ambient light, the mobile compute device comprising:
   a display;
   a camera system comprising a first camera and a second camera, the camera system to capture (i) a first image of a user of the mobile compute device with the first camera and (ii) a second image of a real-world environment of the mobile compute device with the second camera;
   a light analysis module to determine a physical location of an ambient light source relative to the mobile compute device based on the second image;
   an eye analysis module to (i) identify a first corneal reflection and a second corneal reflection in an eye of the user and (ii) determine, based on the physical location, a first correspondence between the first corneal reflection and the ambient light source and a second correspondence between the second corneal reflection and an image displayed on the display;
   a gaze tracking module to perform gaze tracking based on the first correspondence and the second correspondence.

2. The mobile compute device of claim 1, wherein the light analysis module is to (i) analyze the second image to determine an image location of the ambient light source captured in the second image and (ii) determine a direction of the ambient light source relative to the mobile compute device based on the image location; and
   wherein to determine the physical location of the ambient light source comprises to determine the physical location based on the determined direction.

3. The mobile compute device of claim 2, wherein to analyze the second image comprises to identify a region of the second image having at least one of high intensity or high contrast relative to surrounding regions of the second image.

4. The mobile compute device of claim 2, wherein to determine the physical location comprises to determine the physical location of the ambient light source based on the second image and a third image of the real-world environment that includes the ambient light source.

5. The mobile compute device of claim 4, wherein determining the physical location comprises determining a distance of the ambient light source from the mobile compute device by performing triangulation based on the second image and the third image.

6. The mobile compute device of claim 2, wherein to determine the physical location comprises to approximate a distance of the ambient light source from the mobile compute device to a predefined distance.

7. The mobile compute device of claim 1, wherein to identify the first corneal reflection and the second corneal reflection comprises to identify a first region and a second region of the first image having at least one of high intensity or high contrast relative to surrounding regions of the first image.

8. The mobile compute device of claim 1, wherein to determine the first correspondence and the second correspondence comprises to determine the first correspondence and the second correspondence based on known characteristics of at least one of the ambient light source or the image displayed on the display.

9. The mobile compute device of claim 8, further comprising a display module to determine the image displayed, at a point in time at which the first image is captured, on the display of the mobile compute device;
   wherein to determine the second correspondence comprises to determine the second correspondence based on at least one characteristic of the image displayed.

10. The mobile compute device of claim 9, wherein to determine the second correspondence comprises to determine the second correspondence based on at least one of a size or color of the image displayed.

11. The mobile compute device of claim 1, wherein the eye analysis module is to analyze the first image to identify an edge of a pupil of the user; and
    wherein to perform the gaze tracking comprises to perform the gaze tracking based further on the edge of the pupil of the user.

12. The mobile compute device of claim 1, wherein the first camera has a field of view in a direction opposite a field of view of the second camera about the display.

13. One or more non-transitory, machine-readable storage media comprising a plurality of instructions stored thereon that, in response to execution by a compute device, cause the compute device to:
    capture, by a first camera of the compute device, a first image of a user of the compute device;
    capture, by a second camera of the compute device different from the first camera, a second image of a real-world environment of the compute device;
    determine a physical location of an ambient light source relative to the compute device based on the second image;
    identify a first corneal reflection and a second corneal reflection in an eye of the user captured in the first image;
    determine, based on the physical location, a first correspondence between the first corneal reflection and the ambient light source and a second correspondence between the second corneal reflection and an image displayed on a display of the compute device; and
    perform gaze tracking based on the first correspondence and the second correspondence.

14. The one or more non-transitory, machine-readable storage media of claim 13, wherein the plurality of instructions further cause the compute device to:
    analyze the second image to determine an image location of the ambient light source captured in the second image; and
    determine a direction of the ambient light source relative to the compute device based on the image location;
    wherein to determine the physical location of the ambient light source comprises to determine the physical location based on the determined direction.

15. The one or more non-transitory, machine-readable storage media of claim 14, wherein to analyze the second image comprises to identify a region of the second image having at least one of high intensity or high contrast relative to surrounding regions of the second image.

16. The one or more non-transitory, machine-readable storage media of claim 14, wherein to determine the physical location comprises to determine the physical location of the ambient light source based on the second image and a third image of the real-world environment that includes the ambient light source.

17. The one or more non-transitory, machine-readable storage media of claim 16, wherein to determine the physical location comprises to determine a distance of the ambient light source from the compute device by performing triangulation based on the second image and the third image.

18. The one or more non-transitory, machine-readable storage media of claim 15, wherein to determine the physical location comprises to approximate a distance of the ambient light source from the compute device to a predefined distance.

19. The one or more non-transitory, machine-readable storage media of claim 13, wherein to determine the first correspondence and the second correspondence comprises to determine the first correspondence and the second correspondence based on known characteristics of at least one of the ambient light source or the image displayed on the display.

20. The one or more non-transitory, machine-readable storage media of claim 13, wherein the first camera has a field of view in a direction opposite a field of view of the second camera about the display.

21. A method for gaze tracking by ambient light, the method comprising:
capturing, by a first camera of a mobile compute device, a first image of a user of the mobile compute device;
capturing, by a second camera of the mobile compute device different from the first camera, a second image of a real-world environment of the mobile compute device;
determining, by the mobile compute device, a physical location of an ambient light source relative to the mobile compute device based on the second image;
identifying, by the mobile compute device, a first corneal reflection and a second corneal reflection in an eye of the user captured in the first image;
determining, by the mobile compute device and based on the physical location, a first correspondence between the first corneal reflection and the ambient light source and a second correspondence between the second corneal reflection and an image displayed on a display of the mobile compute device; and
performing, by the mobile compute device, gaze tracking based on the first correspondence and the second correspondence.

22. The method of claim 21, further comprising:
analyzing, by the mobile compute device, the second image to determine an image location of the ambient light source captured in the second image; and
determining, by the mobile compute device, a direction of the ambient light source relative to the mobile compute device based on the image location;
wherein determining the physical location of the ambient light source comprises determining the physical location based on the determined direction.

23. The method of claim 21, wherein determining the first correspondence and the second correspondence comprises determining the first correspondence and the second correspondence based on known characteristics of at least one of the ambient light source or the image displayed on the display.

24. The method of claim 23, further comprising determining the image displayed, at a point in time at which the first image is captured, on the display of the mobile compute device;
wherein determining the second correspondence comprises determining the second correspondence based on at least one characteristic of the image displayed.

25. The method of claim 21, further comprising analyzing, by the mobile compute device, the first image to identify an edge of a pupil of the user;
wherein performing the gaze tracking comprises performing the gaze tracking based further on the edge of the pupil of the user.

* * * * *